United States Patent [19]

Bounini

[11] 4,252,568

[45] Feb. 24, 1981

[54] PROCESS FOR PREPARING CALCINED GYPSUM AND GYPSUM BOARD USING LIGNO SULFONATES

[75] Inventor: Larbi Bounini, Hanover Park, Ill.

[73] Assignee: United States Gypsum Company, Chicago, Ill.

[21] Appl. No.: 90,957

[22] Filed: Nov. 5, 1979

[51] Int. Cl.³ ............................................. C04B 11/14
[52] U.S. Cl. ...................................... 106/111; 156/39
[58] Field of Search ............................... 106/109–111; 156/39

[56] References Cited

U.S. PATENT DOCUMENTS

| | | | |
|---|---|---|---|
| 3,770,468 | 11/1973 | Knauf et al. | 106/111 |
| 4,059,456 | 11/1977 | De Rooy et al. | 106/111 |
| 4,117,070 | 9/1978 | O'Neill | 156/39 |
| 4,153,373 | 5/1979 | O'Neill | 366/165 |
| 4,169,747 | 10/1979 | De Rooy et al. | 186/114 |

*Primary Examiner*—James Poer
*Attorney, Agent, or Firm*—Kenneth E. Roberts; Robert H. Robinson; Samuel Kurlandsky

[57] ABSTRACT

A process for preparing calcined gypsum (stucco) which comprises treating a mass of calcined gypsum by adding, with thorough blending, small portions of an aqueous solution of ligno sulfonate; allowing the treated stucco to heal; and optionally drying the healed stucco and further optionally grinding the healed stucco. If the treated calcined gypsum is not to be used shortly after the healing procedure, it should be dried to provide storage stability. If further strength is desired the treated stucco should be ground to expose fresh crystal faces. The process is particularly useful in gypsum board manufacture and production of bagged building and industrial plasters.

10 Claims, 1 Drawing Figure

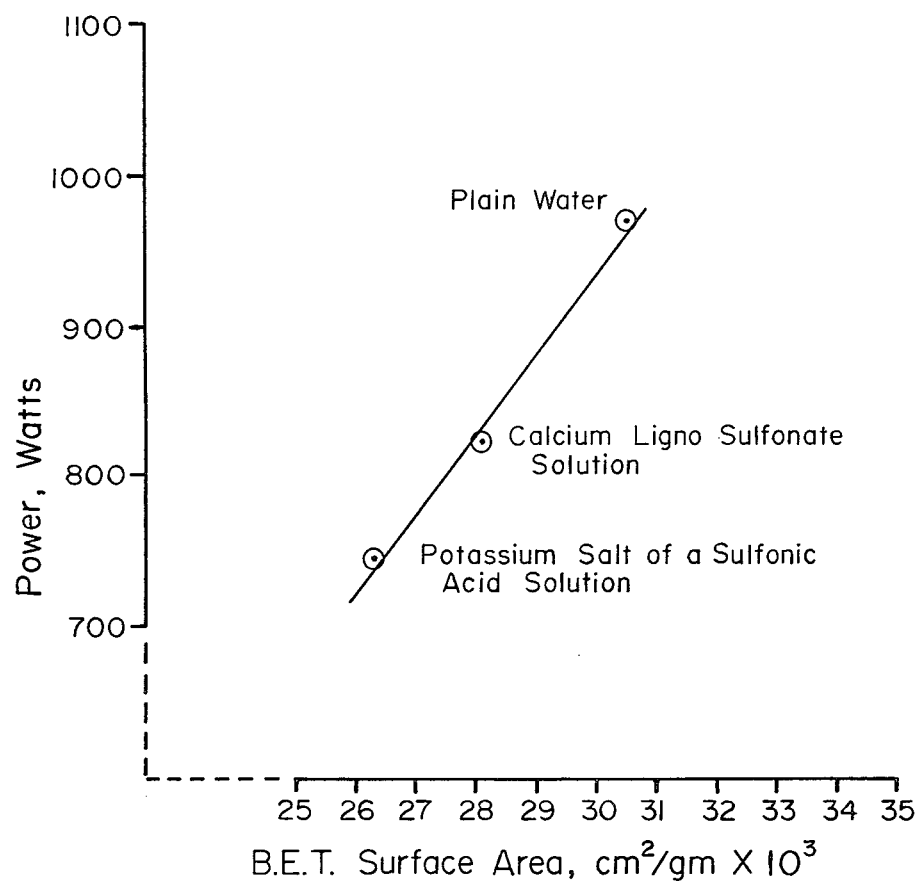

PROCESS FOR PREPARING CALCINED GYPSUM AND GYPSUM BOARD USING LIGNO SULFONATES

BACKGROUND OF THE INVENTION

This invention relates to an improved process for preparing calcined gypsum and more particularly pertains to the formation of low consistency calcium sulfate hemihydrate produced by atmospheric calcination processes, particularly continuous kettle operations.

Ordinarily calcined gypsum from good quality gypsum by atmospheric processes, known under various names, such as stucco, plaster of Paris, molding plaster, building plaster and the like, consists of the beta hemihydrate of calcium sulfate, $CaSO_4.\frac{1}{2}H_2O$. This material is capable of being reconverted into calcium sulfate dihydrate, $CaSO_4.2H_2O$, by mixing it with proper amounts of water. The theoretical water required to convert the stucco to gypsum dihydrate is only 18.7 parts by weight per 100 parts of pure hemihydrate $CaSO_4.\frac{1}{2}H_2O$. However, in order to produce a workable aqueous slurry in a modern automated gypsum board plant the stucco will be mixed with amounts of water in excess of that required for hydration. Thus the mixing water required may vary from about 85–100 parts of water per 100 parts of the calcined gypsum by weight. The excess, about 67 to about 82 parts of water, present in the slurry will be removed by drying the board. Ordinarily, gypsum board dryers in automated gypsum board manufacturing lines will remove this water, for example, by maintaining a drying air temperature at about 400° F. and requiring a drying time of about 40 minutes. Of course, the time-temperature relationship is variable from one processing plant to another primarily depending upon the particular gypsum source and processing equipment available.

Continuously calcined gypsum stucco, prepared in a kettle or a rotary calciner for example, processed in the usual manner comprises stucco particles with innumerable fissures and imperfections resulting from the violent dehydration process occuring under the harsh conditions of atmospheric calcination. These particles when added to the water and agitated, as during the slurry mixing process step, break up into smaller fragments thus exposing large surface areas of calcium sulfate, and therefore requiring a high amount of mixing water to obtain a fluid slurry. The additional water forms voids upon evaporation and thus greatly impairs the strength of products formed from this stucco.

It has become the custom in the gypsum industry to describe the amount of water, expressed in cubic centimeters or grams required to be added to 100 grams of calcined gypsum to produce a slurry with a standard fluidity such as the amount in a given time to flow through a standardized container as the "consistency" of that plaster. This is usually expressed by merely a number, it being understood, however, that the number means cubic centimeters or grams of water per 100 grams of that stucco. In addition, it has further become the custom in the gypsum industry to delineate particular consistencies for particular mixing conditions such as a "7 second consistency" wherein the stucco is dispersed by mechanical mixing in a laboratory mixer at a high sheer intensity and for a standard time of 7 seconds.

For many years various additives have been admixed with ordinary calcined gypsum for the purpose of producing a lower consistency than that which is characteristic of the particular calcined gypsum. Such materials may be exemplified by various ligno sulfonates and synthesized non-lignin based high molecular weight sulfonates as being a class of stucco dispersants having particular efficacy. These chemicals are considered chemical consistency reducers and apparently they act to reduce the interaction between the stucco fragments in aqueous suspension thus requiring less water to make a slurry of standard fluidity. Such segmented stuccos ordinarily have a consistency of around 68–79 cc.

DESCRIPTION OF THE PRIOR ART

In U.S. Pat. Nos. 4,117,070 and 4,153,373, there are described various apparatus and processes for continuously treating calcined gypsum so as to lower the water demand and provide a treated calcined gypsum mass which may be continuously fed into the slurry mixer of an automated gypsum board line. The treatments comprise thoroughly blending small amounts of water into the dry stucco, resulting in a damp but dry appearing material; and allowing it to "heal" before usage in gypsum board manufacture. By "healing" is meant allowing the small amounts of free water to remain on the particle's surface for about 1–10 minutes or more during which time large fissures on the particle may fuse so as to resist subsequent disintegration into micron sized factions upon mixing the treated material with water for hydration to gypsum dihydrate.

In U.S. patent application by Eugene O'Neill under Ser. No. 939,624 now U.S. Pat. No. 4,201,595 there is disclosed a process which is an improvement over said patents by grinding the water treated material, generally up to about 4 times, in order to recapture physical properties lost during the water treatment.

Copending U.S. Ser. Nos. 939,624 and 054,069 relating to improvements in U.S. Pat. No. 4,117,070 recite that following the rapid water treatment and healing of the calcined gypsum, the water treated calcined gypsum may be combined with conventional additives such as "fluidizing agents" for use in making gypsum wallboard or bagged plaster products. Thus, U.S. Ser. No. 939,624 recites that the common chemical dispersing or fluidizing agents for calcined gypsum such as the lignins, ligno sulfates, ligno sulfonates and condensation polymerization products thereof may be included with the treated stucco in minor amounts to enable the use of even less mixing water in addition to the water reducing effects accomplished by the prior rapid water treatment steps.

U.S. Pat. No. 3,770,468 discloses treating freshly burnt plaster of Paris containing considerable quantities, e.g. 50% of anhydrite III (an unstable, very soluble form which almost instantly converts back to much more stable hemihydrate) with aqueous solutions of retarders and/or wetting agents to stabilize that plaster. Such burnt plaster may be encountered in European flash calcination processes but is uncharacteristic to atmospheric continuous kettle or even continuous rotary calcining operations. It is uncommon for these latter operations to produce plasters containing more than a few percent of such anhydrite at which levels the ordinary cooling in moisture laden air usually accomplishes almost complete instantaneous conversion to the hemihydrate.

SUMMARY OF THE INVENTION

This invention relates to an improvement in processes for preparing calcined gypsum (stucco) by rapidly water treating continuously calcined gypsum to a healed calcium sulfate hemihydrate having the property of lowered water demand, which improvement provides increased effectiveness of rapid water treatment to the damp but dry appearing stucco and, quite surprisely, easier flowability of the damp but dry appearing treated stucco and easier grindability of the treated stucco.

The process involves treating the stucco with a dilute aqueous solution of a sulfonate instead of with plain water for the rapid water treatment. Laboratory scale and full-sized plant trials indicate thereby that easier flowability and grindability of the treated stucco as a powder and in aqueous slurry results without impairing the ability of the treated calcined gypsum to produce acceptable properties in products such as gypsum board, industrial plasters and building plasters. Further, this change in addition sequence appears to require less excess water. At present it is not known whether these result from a more effective coating of the stucco particles with the water during the water treatment or whether they result from the more efficient water treatment, i.e., fusing of more and/or smaller fissures and or fractures to a greater depth in the conglomerate's surface. But in any case, merely changing the order of addition on the use of the same amounts of the same materials resulted in less surface area irregularity and improved rheological properties in the so treated stucco.

Thus, principal objects and advantages of the present invention are the provisions of an improved process for treating calcined gypsum so as to lower the water demand of the stucco while maintaining the material's ability to produce acceptable physical and rheological properties in such products as gypsum board, building plasters and industrial plasters.

In one preferred embodiment of the present invention, it was found the above objects and advantages and others were accomplished by the steps by forming a dilute aqueous solution of one or more sulfonated lignin salts or polymerized salts of sulfonic acid similar to the natural lignin materials; blending a small amount of the solution thoroughly with stucco so as to admix around 20–200 lbs. (preferably 40–60 lbs.) of water from the solution per ton (2,000 lbs.) of stucco and on a dry weight solids basis around ½–5 lbs. (preferably 1–3 lbs.) of sulfonate from the solution per ton (2,000 lbs.) of stucco; allowing the solution treated stucco to heal for about 1–10 minutes or more (preferably 3–30 minutes); optionally drying the healed stucco; optionally grinding the healed stucco to increase strength properties of the treated stucco; and for the manufacture of gypsum board therefrom the additional steps of mixing the healed stucco with additional water, the additional water being in an amount to provide from about 50 to about 85 parts of water including water adding in the sulfonate solution per 100 parts of the healed stucco; mixing the water and healed stucco to form a homogeneous slurry; feeding the slurry to a gypsum board making machine to form a wet gypsum board, passing the wet gypsum board to a drier to dry the wet board, and recovering dry gypsum board.

BRIEF DESCRIPTION OF THE DRAWINGS

The FIGURE presents a graphic representation of the correlation in specific surface areas of particles treated by the present invention to power consumed in treating the particles.

DETAILED DESCRIPTION OF THE PREFERRED EMBODIMENTS

It has been found in the present invention that solution treatment with a small but effective amount of a ligno sulfonate or synthesized high molecular weight sulfonic acid derivative equivalent to the natural lignin, for the rapid water treatment instead of using plain water provides a lubricity or lack of attraction forces between the treated particles so that the treated stucco moves more easily, e.g., requires less energy in mixing and conveying the treated material for further processing. The process also results in making the treated stucco easier to meter accurately in the further processing of the stucco so as to overcome problems in surging, sticking and like related handling problems in board formation.

The sulfonates usable in the present invention comprise a wide range of readily available commercial gypsum dispersing agents that may be referred to as water soluble salts of sulfonic acid. Typically, they are anionic wetting agents that are sulfonated lignins or high molecular weight polymerized salts of sulfonic acid. In general they are either by-products of the paper and pulp industry or polymerized salts of sulfonic acid similar to the natural lignin raw material derived agents. Table A lists a number of commercially available ligno sulfonates or polymerized synthetic sulfonates similar thereto which may be utilized in the practice of the present invention.

TABLE A

| Trade Name | Manufacturer | Composition |
|---|---|---|
| Orzan G | Crown Zellerback Corp. | Ammonium ligno sulfonate |
| Orzan SL | Crown Zellerback Corp. | Sodium ligno sulfonate (liquid) |
| Sodalig | International Paper Co. | Sodium ligno sulfonate (liquid) |
| Reax 88-B | Westvaco Chemical Div. | Sodium salt of sulfonated modified kraft lignin |
| Lignosol XD | Reed Chemical Co. | Sodium ligno sulfonate (spray dried) |
| Lignosol TSD | Reed Chemical Co. | Ammonium ligno sulfonate (spray dried) |
| Lignosol SFX | Reed Chemical Co. | Sodium ligno sulfonate (desugarized, spray dried) |
| Daxad 19 | W.R. Grace & Co. | Sodium alkyl naphthalene sulfonic acid salt highly polymerized |
| Marasperse 41-g-3 | American Can Co. | Sodium ligno sulfonate (sulphite paper process lignin) |
| Norlig A | American Can Co. | Ammonium ligon sulfonate (sulphite lignin) |
| Norlig 412 | American Can Co. | Calcium ligno sulfonate (sulphite lignin) |
| Norlig 415 | American Can Co. | Calcium ligno sulfonate (modified sulphite paper process lignin) |
| Lomar HP | Diamond Shamrock | Potassium alkyl naphthalene sulfonic acid salt highly polymerized (spray dried) |

In general, any sulfonate selected from the class consisting of alkali metal ligno sulfonates, alkaline earth metal ligno sulfonates, ammonium ligno sulfonates and corresponding synthesized high molecular weight polymerized water soluble salts of sulfonic acid may be used in the present invention. In addition manganese, chromium, iron and/or zinc salts may be used in the present invention.

Generally, the ligno sulfonates and synthesized sulfonates described hereinabove will be available in aqueous solution or in powder form very readily dissolvable in the water for the normal rapid water treatment of the stucco. Thus, in general the dry stucco will be thoroughly blended with water in amounts of from about 1-10%, and more preferably 2% to 4% by weight of dry stucco. In forming a dilute solution of the sulfonate for use in the present invention, the forms of sulfonate available as solids will be dissolved in the rapid water treatment water and those forms available as liquids will be diluted in the water to be used in the rapid water treatment step. The amount of sulfonates to be added to the treatment water will generally be about ½-5 lbs., or preferably 1-3 lbs. by weight on a solids basis of sulfonate per ton of the dry stucco to be treated. Of course, it is also possible to admix the dry stucco to be treated with the sulfonate and then rapidly water treat this mixture. But in any event, rapid water treating the dry stucco with a solution of the sulfonate results in treated particles of stucco that have improved rheological and powder flow behavior characteristics.

Any method to provide small, limited amounts of the sulfonate and free water on the surface of the stucco may be employed. Thus, the materials may be combined in any order of addition in any of a number of apparatus for the purpose; however it is preferred at present to spray a solution of the sulfonate onto a rapidly moving and tumbling mass of stucco for thorough blending.

The solution treated stucco is allowed to briefly heal, generally for about 1-10 minutes or more, and more preferably around 2-15 minutes, immediately after solution treatment and before further processing. Of course, the duration of the healing depends upon the particular manner of the solution addition and the amounts of solution being added. That is, the addition of greater amounts of water in the range herein will generally require less healing time, which for a solution adding about 3% by weight of water and 1% by weight of sulfonate will be on the order of about 3 minutes.

The stucco feed material for the present invention may be any beta hemihydrate product of conventional batch or continuous calcination from any gypsum source, such gypsum sources being for example high quality natural rock or gypsum derived from chemical processes, including blends of natural rock gypsum and chemical process gypsum.

If the solution treated and healed material is not to be used immediately in production, as when bagged industrial or building plasters are to be made with the addition of further ingredients before the bagging operation, it is preferable to thoroughly dry the material before it is stored for any prolonged period of time. If the solution treated and healed stucco is to be used immediately, as in the production of gypsum board, then it is usually not necessary to dry the material. However, some drying may be desired, particularly if more than the optimum water has been added during the solution treatment or in the event of a shut down in the continuous board making line since drying will enable the healed material to be stored without excessive localized hydration and subsequent impairment of the physical and chemical characteristics. Any drying temperature and time conditions should be selected so as not to remove the chemically combined water in the solution treated and healed stucco.

Further, optionally, the solution treated and healed stucco may be ground to increase the surface area of the treated material generally from about 2.5 to 4 times or more the surface area of the untreated stucco. Depending upon the particular starting stucco, the method of water incorporation and the proposed usage for the material, grinding of the solution treated and healed stucco may or may not be desirable. Generally, for the manufacture of gypsum board from a high purity natural gypsum rock source in a continuous operation, such will not be desirable, and immediate passage of the treated stucco to the processing line, e.g., the slurry mixer of a continuous board forming machine, is appropriate.

The following examples will illustrate various specific embodiments of the process of the present invention. Of course, it is to be understood that the following examples are by way of illustration only and in no way are to be construed as limitations on the present invention. For example, the hereinafter specific examples in most cases utilized neat stucco, e.g., pure continuously calcined beta hemihydrate without additives conventional to normal processing to various industrial bagged plasters, bagged building plasters or additives in conjunction with gypsum board formation.

EXAMPLE 1

In a series of comparative evaluations, continuously calcined beta hemihydrate stuccos produced at different times were treated in laboratory bench scale tests to either incorporate about 3% by weight of free moisture and/or 1 lb. of sulfonate per ton of stucco.

In the evaluations, set forth in Table B, the "Rapid Water Treatment" (RWT) stuccos were treated by thoroughly blending 3% by weight based on the weight of the dry stucco of water into the beta hemihydrate calcium sulfate, allowing the water treated stucco to heal for approximately 1-15 minutes, and then drying the healed material at a temperature of 110° F. in an air circulating oven for 12 hours. For the other evaluations, the procedure remained the same except that the indicated amount of a sulfonate was either added to the gauging water (mixing water for hydration of the calcium sulfate hemihydrate to a set gypsum dihydrate) or incorporated into the RWT water.

From Table B it can be clearly seen in this instance with these particular stuccos and sulfonates that merely changing the order of addition so that the material was treated with a solution of the same sulfonate resulted in much lower normal consistencies than if the stucco was treated with plain water and the sulfonate added in the gauging water or if no sulfonate was added at all.

TABLE B

| | 7 Second Dispersed Consistency | |
|---|---|---|
| Treatment | Sulfonate 1 | Sulfonate 2 |
| Rapid Water Treatment (RWT) with 3% plain water | 72 cc. | 77 cc. |
| (RWT) with 3% plain water plus 1 lb./ton sulfonate added to gauging water | 70 | 73 |
| (RWT) with 3% plain water plus 1 lb./ton sulfonate | 68 | 70 |

TABLE B-continued

| | 7 Second Dispersed Consistency | |
|---|---|---|
| Treatment | Sulfonate 1 | Sulfonate 2 |
| added to RWT water | | |

Sulfonate 1 = Norlig 412 sulfonate
Sulfonate 2 = Reax 88B sulfonate.

During the treatments described in Table B, visual examination of the solution treated rapid water treatment (RWT) stuccos indicated that the moist but dry appearing stuccos in both cases were less lumpy in appearance than the RWT stuccos treated with plain water; thus indicating less agglomeration and sticking between the individual particles and therefore greater ease of handling, conveying and metering the solution treated material with a minimum surging of the material flow rates in continuous board making or bagging operations.

EXAMPLE 2

In a full-sized plant trial for the production of gypsum board, a plant operating line was modified to insert in the stucco feed conveying line, between the continuous calcination equipment and the board slurry mixer, a rapid water treatment mixer of the continuous paddle mixer type to add about 1–4% of water to the dry stuccos. The calcination and gypsum board lines were operated for a brief period of time so as to produce ⅜ inch gypsum board at a rate of 50 ft. per minute with 2% by weight plain water treatment of the stucco, on a dry weight basis, and 2 lb. per ton of Raylig sulfonate being added to the gauging water for the gypsum board slurry mixer. Then the water for the RWT was modified to contain from 0.5 to 1 lb. per ton of stucco, on a dry solids basis, of Reax 88B sulfonate and the board making operation visually observed for effectiveness of using a sulfonate solution for the RWT water. It was visually observed that flow rate and handleability of the RWT treated material with sulfonate solution was at least as good if not better including meterability of the treated material to the board mixer and general handling and conveyability of the treated material during processing. Chemically and physically satisfactory board was produced.

EXAMPLE 3

The process of the present invention was applied in another series of evaluations to Southard Oklahoma stucco using different sulfonates and different amounts of sulfonate addition as set forth under Example 1.

In the first series of this evaluation, 4 different sulfonates were added at the rate of 2 lbs., solids weight basis, of the sulfonate per ton of dry stucco and one of the sulfonates was also added at 1 lb. and 4 lbs. per ton rates, with results as set forth in Table C.

TABLE C

| Treatment | Seconds Dispersed Consistency | Tem. Rise Set | Max. Rate of Temp. Rise during Set |
|---|---|---|---|
| Stucco with 2% water treatment | 74 | 18 minutes | 5° F./minute |
| Stucco with 2% water treatment with sulfonate solutions: -2 lb/ton Lomar HP sulfonate | 71[a](69)[b] | 16 (18) | 5 (4.3) |
| -2 lb/ton Daxad 19 sulfonate | 69 (68) | 17 17½) | 4.5 (4.0) |

TABLE C-continued

| Treatment | Seconds Dispersed Consistency | Tem. Rise Set | Max. Rate of Temp. Rise during Set |
|---|---|---|---|
| -2 lb/ton Lignosol SFX sulfonate | 72 (71) | 17½ (19) | 4.8 (4.3) |
| -2 lb/ton Norlig 415 sulfonate | 70 (70) | 23¾ (19¾) | 3.5 (3.9) |
| -1 lb/ton Norlig 415 sulfonate | 73 (73) | 21¾ (19½) | 3.2 (4.1) |
| -4 lb/ton Norlig 415 sulfonate | 69 (69) | 21 (21½) | 3.6 (3.6) |

[a]Solution added in RWT water.
[b]Solution added in gauging water.

TABLE D

| Treatment | Power Consumption in RWT Mixer | Surface Area $cm^2/gm$ | B.E.T. Intercepts | C value |
|---|---|---|---|---|
| Untreated | — | 68,000 | 0.005885 | 120 C |
| % Plain Water | 970 watts | 30,610 | .00893 | 159 C |
| % Norlig 415 sulfonate solution | 821 watts | 28,110 | .0104 | 104 C |
| % Lomar HP sulfonate solution | 746 watts | 26,290 | .0149 | 110 C |

As can be seen from Table C for some inexplicable reason within this portion of evaluations addition of like amounts of sulfonates to the gauging water appeared in two instances to give slightly better results but in most cases consistency, maximum rate of temperature rise during set and set times (which are additional measures of stucco activity during hydration) were better on addition of the sulfonate to the rapid water treatment water.

In a second series of the evaluations of this example accurate specific surface areas for certain of the samples were determined by a standard nitrogen adsorption method, generally known as the B.E.T. surface area determination method which is quite accurate for particles with cracks, fissures and/or pores and much more complete for such particles, than the Blaine surface area measurements. In addition, the power consumption of the mixing device used for the rapid water treatment of the continuously calcined stucco for the samples was also determined by power readings on the mixer. The results of the specific surface areas and power consumptions are set forth in Table D.

The results set forth in Table D are shown diagrammatically in the FIGURE. From the FIGURE it is apparent that with treatment according to the present invention using increasingly more efficient sulfonates at the same level that the energy required to move the wet mass decreased directly as the surface area of the treated particle decreased. The decreased surface areas (by about 1/5th or so of the plain water treated particle's surface area) are due to the increased healing of fissures and fractures in the particles surface as a result of the present invention.

Having completely described this invention, what is claimed is:

1. In a process for manufacturing beta calcium sulfate hemihydrate stucco of the type wherein stucco is fed to a blender, about 1 to about 10% by weight of water is blended with the stucco in the blender, and the water treated stucco is allowed to heal whereby the healed stucco has a reduced water demand; the improvement which comprises: in the step of blending the stucco with a small amount of water, adding on a dry solids weight basis about ½ lb. to about 5 lbs. per 2,000 lbs. ton of dry stucco of a sulfonate selected from the group consisting of (1) alkali metal, alkaline earth metal and ammonium ligno sulfonates, (2) alkali metal, alkaline earth metal, and ammonium polymerized salts of sulfonic acid and (3) mixtures of such sulfonates whereby the surface area of the healed stucco is reduced.

2. The process of claim 1 in which the sulfonate is present in an amount of about 1–3 lbs. per ton of the dry stucco to be treated and water is present in an amount of about 40–60 lbs. per ton of the dry stucco to be treated.

3. The process of claim 1 in which a solid form sulfonate is dissolved in the water or a liquid sulfonate is diluted in the treatment water.

4. The process of claim 1 in which the solution treated stucco is allowed to heal for about 1–30 minutes.

5. An improved process for preparing beta calcium sufate hemihydrate stucco characterized by providing the stucco with a reduced water demand obtaining greater rheological and powder flow behavior of the treated stucco particles, which comprises:
 (1) supplying beta calcium sulfate hemihydrate stucco feed to be conveyed to a blender;
 (2) conveying the stucco feed to the blender;
 (3) Blending with the stucco feed a water solution of sulfonate, the amount of water ranging from about 1% to about 10% by weight of the stucco feed and the sulfonate ranging from about ½ lb. to about 5 lbs. per 2,000 lb. ton on a dry solids weight basis to the stucco feed, said sulfonate being selected from the group consisting of (a) alkali metal, alkaline earth metal and ammonium ligno sulfonates, (b) alkali metal, alkaline earth metal and ammonium high molecular weight polymerized sulfonic acid salts and (c) mixtures of such sulfonates;
 (4) Allowing the solution treated stucco to heal;
 (5) Drying the healed stucco by subjecting it to elevated temperatures;
 (6) Grinding the dried, healed stucco to reactivate the surface so as to improve the rate of strength development and ultimate strength in a gypsum product and;
 (7) Recovering a dried, healed calcined stucco which is storage stable, has reduced water demand, is capable of developing substantially full compressive strength in a gypsum product and has improved hydrophilic characteristics.

6. An improved process for manufacturing gypsum board characterized by improved handling properties and decreased surface area of the treated calcium sulfate hemihydrate stucco and by using a reduced amount of water to fluidize the treated stucco in forming a slurry which is fed to a board making machine which comprises:
 (1) Supplying stucco feed to be conveyed to a gypsum slurry mixer;
 (2) Conveying the stucco feed to a blender;
 (3) Blending with the stucco about from 20 to 200 lbs. per ton of water and about from ½ to 5 lbs. per ton of a sulfonate selected from the group consisting of (a) alkali metal, alkaline earth metal and ammonium ligno sulfonates, (b) alkali metal, alkaline earth metal and ammonium high molecular weight polymerized sulfonic acid salts and (c) mixtures of such sulfonates;
 (4) Allowing the sulfonate-water treated stucco to heal;
 (5) Feeding the healed stucco to a gypsum slurry mixer;
 (6) Adding additional water to the healed stucco in the slurry mixer, said additional water being added in an amount sufficient to provide about from 50 to 85 parts of water, including water added in the blender, per 100 parts of stucco which results in a substantially reduced amount of water to be evaporated from the wet board;
 (7) Mixing the healed stucco and water in the slurry mixer to form a homogeneous slurry;
 (8) Feeding the slurry to a gypsum board making machine to form wet gypsum board;
 (9) Drying the wet gypsum board; and
 (10) Recovering dry gypsum board consisting essentially of calcium sulfate dihydrate.

7. The process of claim 6 in which the sulfonate is present in an amount of about 1–3 lbs. per ton of stucco and the sulfonate is sodium ligno sulfonate.

8. The process of claim 6 in which the sulfonate is present in an amount of about 1—3 lbs. per ton of stucco and the sulfonate is calcium ligno sulfonate.

9. The process of claim 6 in which the sulfonate is present in an amount of about 1–3 lbs. per ton of stucco and the sulfonate is ammonium ligno sulfonate.

10. The process of claim 6 in which the sulfonate is present in an amount of about 1–3 lbs. per ton of stucco and the sulfonate is a polymerized alkyl naphthalene sulfonic acid potassium acid.

* * * * *

UNITED STATES PATENT AND TRADEMARK OFFICE
CERTIFICATE OF CORRECTION

PATENT NO. : 4,252,568
DATED : February 24, 1981
INVENTOR(S) : Larbi Bounini

It is certified that error appears in the above-identified patent and that said Letters Patent are hereby corrected as shown below:

In column 5, line 22 the terms "about 1/25 lbs" should read -- about 1/2 - 5 lbs. --.

In Claim 10, line 48 the terms "sulfonic acid potassium acid" should read -- sulfonic acid potassium salt --.

Signed and Sealed this

Twenty-eighth Day of July 1981

[SEAL]

Attest:

GERALD J. MOSSINGHOFF

Attesting Officer     Commissioner of Patents and Trademarks